United States Patent
Sorensen et al.

(10) Patent No.: US 8,418,875 B2
(45) Date of Patent: Apr. 16, 2013

(54) COHERENT PRODUCT INCLUDING PARTIALLY SEPARATED PLASTIC OPPOSING WALL-SECTION COMPONENTS

(75) Inventors: Jens Ole Sorensen, Rancho Santa Fe, CA (US); Soren Christian Sorensen, Grand Cayman (KY)

(73) Assignee: Sorensen Research and Development Trust, San Diego, CA (US)

( * ) Notice: Subject to any disclaimer, the term of this patent is extended or adjusted under 35 U.S.C. 154(b) by 1214 days.

(21) Appl. No.: 10/540,096

(22) PCT Filed: Jan. 12, 2004

(86) PCT No.: PCT/US2004/000662
§ 371 (c)(1), (2), (4) Date: Jun. 20, 2005

(87) PCT Pub. No.: WO2004/065232
PCT Pub. Date: Aug. 5, 2004

(65) Prior Publication Data
US 2006/0013975 A1    Jan. 19, 2006

Related U.S. Application Data

(60) Provisional application No. 60/440,227, filed on Jan. 14, 2003.

(51) Int. Cl.
*A47J 39/02* (2006.01)

(52) U.S. Cl.
USPC ..................... 220/592.2; 220/921

(58) Field of Classification Search ............ 220/23.87, 220/592.2, 592.23, 592.17, 592.15, 921, 220/919, 918; 229/403
See application file for complete search history.

(56) References Cited

U.S. PATENT DOCUMENTS

| | | | | |
|---|---|---|---|---|
| 3,315,872 A * | 4/1967 | Carbone | ........................ | 215/233 |
| 3,443,715 A * | 5/1969 | Edwards | ........................ | 220/671 |
| 4,051,787 A | 10/1977 | Nishitani et al. | | |
| 4,456,142 A * | 6/1984 | Burling | ........................ | 220/4.28 |
| 4,779,902 A * | 10/1988 | Lee | ........................ | 285/260 |
| 4,844,405 A | 7/1989 | Sorensen | | |
| 5,132,071 A | 7/1992 | Sorensen | | |
| 5,228,742 A | 7/1993 | Johnson et al. | | |
| 5,979,693 A * | 11/1999 | Bane, III | ........................ | 220/592.2 |
| 6,467,646 B2 * | 10/2002 | Schafer | ........................ | 220/600 |
| 6,599,460 B1 | 7/2003 | Brown et al. | | |
| 6,841,104 B2 | 1/2005 | Brown et al. | | |
| 2001/0032801 A1 * | 10/2001 | Dobler | ........................ | 206/733 |
| 2004/0084459 A1 | 5/2004 | Brown et al. | | |

* cited by examiner

*Primary Examiner* — Stephen Castellano
(74) *Attorney, Agent, or Firm* — Edward W. Callan (57) ABSTRACT

A wall section of a coherent product, such as a container, includes at least two opposing plastic components. At least a first one of the opposing plastic components is injection molded and includes a wall of non-uniform thickness that defines some ribs and a web located between two of the ribs in a portion of the wall where the wall is less thick than in the ribs. At a cross section of the first plastic component, over the height of the ribs the predominant thickness across each of the two ribs is significantly thicker than the thickness of the web. At least the crest of a portion of the ribs of one of the plastic components directly or indirectly contacts another plastic component, and at least a portion of the web of the one plastic component is apart from the web of the other plastic component.

3 Claims, 7 Drawing Sheets

COHERENT PRODUCT INCLUDING PARTIALLY SEPARATED PLASTIC OPPOSING WALL-SECTION COMPONENTS

CROSS-REFERENCE TO RELATED APPLICATION

For the United States of America only, this is a continuation-in-part of U.S. Provisional Patent Application No. 60/440,227 filed Jan. 14, 2003.

BACKGROUND

The present invention generally pertains to wall sections of coherent products having opposing plastic wall components and is particularly directed to improvements in plastic products, such as cups and food containers that include thin-wall sections.

SUMMARY OF THE INVENTION

The present invention provides a coherent product including a wall section, wherein the wall section comprises: a first plastic component that is injection molded and includes a wall of non-uniform thickness that defines some ribs and a web located between two of the ribs in a portion of the wall where the wall is less thick than in the ribs; and an opposing second plastic component that is injection molded and includes a wall of non-uniform thickness that defines some ribs and a web located between two of the ribs in a portion of the wall where the wall is less thick than in the ribs; wherein at least the crest of a portion of the two ribs of the first plastic component directly or indirectly contacts the second plastic component, and at least a portion of the web of the first plastic component is apart from the web of the second plastic component; and wherein at a cross section of the first plastic component, over the height of the ribs the predominant thickness across each of the two ribs is significantly thicker than the thickness of the web; wherein at a cross section of the second plastic component, over the height of the ribs the predominant thickness across each of the two ribs is significantly thicker than the thickness of the web; and wherein at least one pair of ribs of one said plastic component are spaced apart to define a notch in which the rib of the other said plastic component is disposed without contacting the web of the one said plastic component.

The present invention thereby enhances the stiffness-to-weight ratio of a wall section having a given thickness.

The present invention also provides cups and other containers, such as food containers having such wall sections.

The present invention also provides a coherent product including a wall section, wherein the wall section comprises: a first plastic wall component that is injection molded and includes two or more ribs and a web therebetween; and an opposing second plastic wall component that is injection molded and includes two or more ribs and a web therebetween; wherein at least a portion of the ribs of one said wall component directly or indirectly contact the other said wall component, and at least a portion of the web of the one said wall component is apart from the web of the other said wall component; and wherein one rib of said at least one pair of spaced-apart ribs of said one wall component contacts the web of the other said wall component, and the other rib of said at least one pair of spaced-apart ribs of said one said wall component does not contact the web of the other said wall component.

The present invention still further provides a coherent product including a wall section, wherein the wall section comprises: a first plastic wall component that is injection molded and includes two or more ribs and a web therebetween; and an opposing second plastic wall component that is injection molded and includes two or more ribs and a web therebetween; wherein at least a portion of the ribs of one said wall component directly or indirectly contact the other said wall component, and at least a portion of the web of the one said wall component is apart from the web of the other said wall component; and wherein the ribs of one said wall component are aligned at an angle to the ribs of the other said wall component, and at least a portion of the ribs of said one wall component contact at least a portion of the ribs of said other wall component.

DETAILED DESCRIPTION

Figure 1:
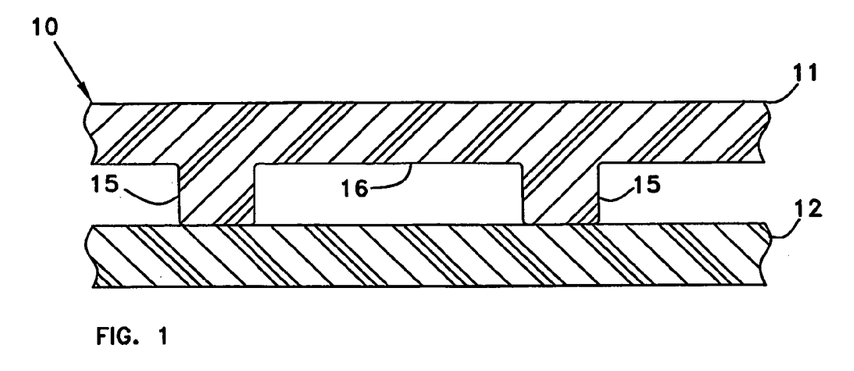
FIG. 1 is a sectional view of a first embodiment of a wall section according to the present invention.

Referring to FIG. 1, a first embodiment of a wall section 10 according to the present invention includes a first plastic component 11 and an opposing second plastic component 12.

The first plastic component 11 is injection molded and includes a wall of non-uniform thickness that defines some ribs 15 and a web 16 located between two of the ribs 15 in a portion of the wall where the wall is less thick than in the ribs 15. At a cross section of the first plastic component 11, over the height of the ribs 15 the predominant thickness across each of the two ribs 15 is thicker than the thickness of the web 16. The second wall component 12 does not include ribs and is either injection molded or thermoformed. The crests of the two ribs 15 of the first plastic component 11 contact the second plastic component 12, and the web 16 of the first plastic component 11 is apart from the second plastic component 12.

Figure 2:
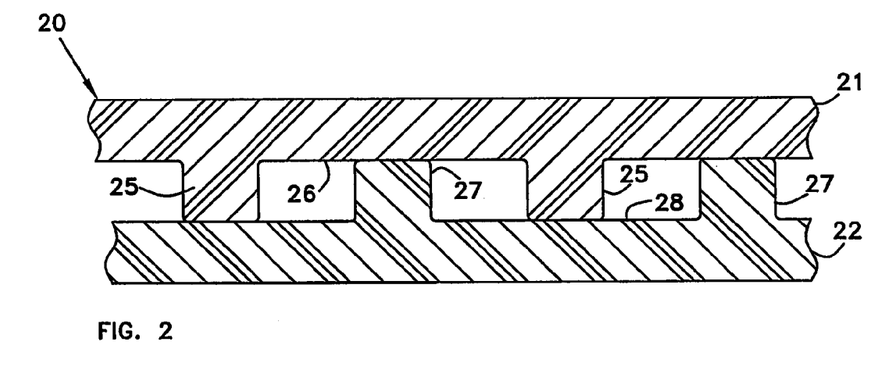
FIG. 2 is a sectional view of a second embodiment of a wall section according to the present invention.

Referring to FIG. 2, a second embodiment of a wall section 20 according to the present invention includes a first plastic component 21 and an opposing second plastic component 22. The first plastic component 21 is injection molded and includes a wall of non-uniform thickness that defines some ribs 25 and a web 26 located between two of the ribs 25 in a portion of the wall where the wall is less thick than in the ribs 25, wherein at a cross section of the first plastic component 21, over the height of the ribs 25 the predominant thickness across each of the two ribs 25 is thicker than the thickness of the web 26. The second plastic component 22 is also injection molded and includes a wall of non-uniform thickness that defines some ribs 27 and a web 28 located between two of the ribs 27 in a portion of the wall where the wall is less thick than in the ribs 27, wherein at a cross section of the second plastic component 22, over the height of the ribs 27 the predominant thickness across each of the two ribs 27 is thicker than the thickness of the web 28. The crests of the ribs 25 of the first plastic component 21 contact the web 28 of the second plastic component 22, and the web 26 of the first plastic component 21 is apart from the web 28 of the second plastic component 22. Also, the crests of the ribs 27 of the second plastic component 22 contact the web 26 of the first plastic component 21.

Figure 3:
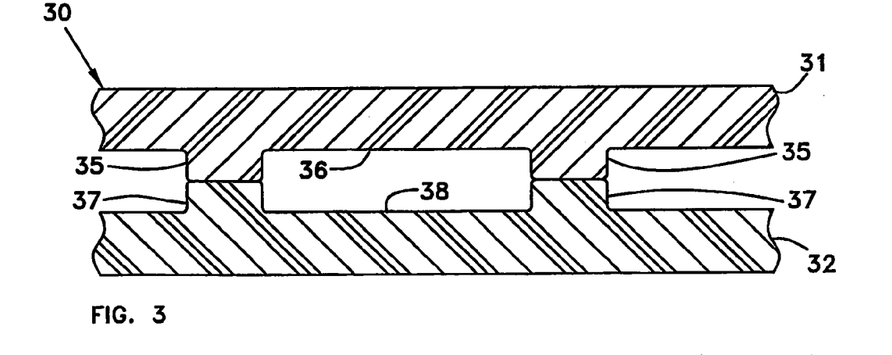
FIG. 3 is a sectional view of a third embodiment of a wall section according to the present invention.

Referring to FIG. 3, a third embodiment of a wall section 30 according to the present invention includes a first plastic component 31 and an opposing second plastic component 32. The first plastic component 31 is injection molded and includes a wall of non-uniform thickness that defines some ribs 35 and a web 36 located between two of the ribs 35 in a portion of the wall where the wall is less thick than in the ribs 35, wherein at a cross section of the first plastic component 31, over the height of the ribs 35 the predominant thickness across each of the two ribs 35 is thicker than the thickness of the web 36. The second plastic component 32 is also injection molded and includes a wall of non-uniform thickness that defines some ribs 37 and a web 38 located between two of the ribs 37 in a portion of the wall where the wall is less thick than in the ribs 37, wherein at a cross section of the second plastic component 32, over the height of the ribs 37 the predominant thickness across each of the two ribs 37 is thicker than the thickness of the web 38. The crests of the ribs 35 of the first plastic component 21 contact the crests of the ribs 37 of the second plastic component 32, and the web 36 of the first plastic component 31 is apart from the web 38 of the second plastic component 32.

Figure 4:
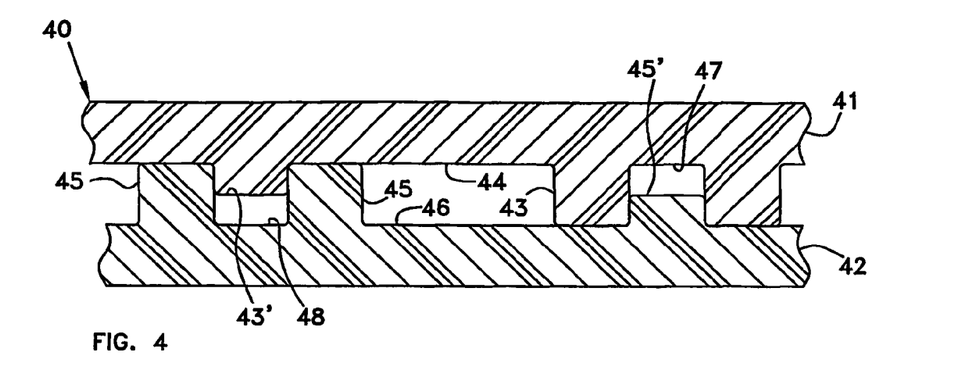
FIG. 4 is a sectional view of a fourth embodiment of a wall section according to the present invention.

Referring to FIG. 4, a fourth embodiment of a wall section 40 according to the present invention includes a first plastic component 41 and an opposing second plastic component 42. The first plastic component 41 is injection molded and includes a wall of non-uniform thickness that defines some ribs 43, 43' and a web 44 located between two of the ribs 43, 43' in a portion of the wall where the wall is less thick than in the ribs 43, 43', wherein at a cross section of the first plastic component 41, over the height of the ribs 43, 43' the predominant thickness across each of the two ribs 43, 43' is thicker than the thickness of the web 44. The second plastic component 42 is also injection molded and includes a wall of non-uniform thickness that defines some ribs 45, 45' and a web 46 located between two of the ribs 45, 45' in a portion of the wall where the wall is less thick than in the ribs 45, 45', wherein at a cross section of the second plastic component 42, over the height of the ribs 45, 45' the predominant thickness across each of the two ribs 45, 45' is thicker than the thickness of the web 46. The crests of the ribs 43 of the first plastic component 41 contact the web 46 of the second plastic component 42, and the web 44 of the first plastic component 41 is apart from the web 46 of the second plastic component 42. Also, the crests of the ribs 45 of the second plastic component 42 contact the web 44 of the first plastic component 41.

At least one pair of ribs 43 of the first wall component 41 are spaced apart by slightly more than the width of a rib 45' of the second wall component 42 to define a notch 47 in which the rib 45' of the second wall component 42 is disposed without contacting the web 44 of the first wall component 41; and at least one pair of ribs 45 of the second wall component 42 are spaced apart by slightly more than the width of a rib 43' of the first wall component 41 to define a notch 48 in which the rib 43' of the first wall component 41 is disposed without contacting the web 46 of the second wall component 42. Such disposition of the ribs 43', 45' in the respective notches 47, 48 prevents movement of the first wall component 41 with respect to the second wall component 42 and thereby maintains an optimum stiffness of the wall section 40.

Figure 5:
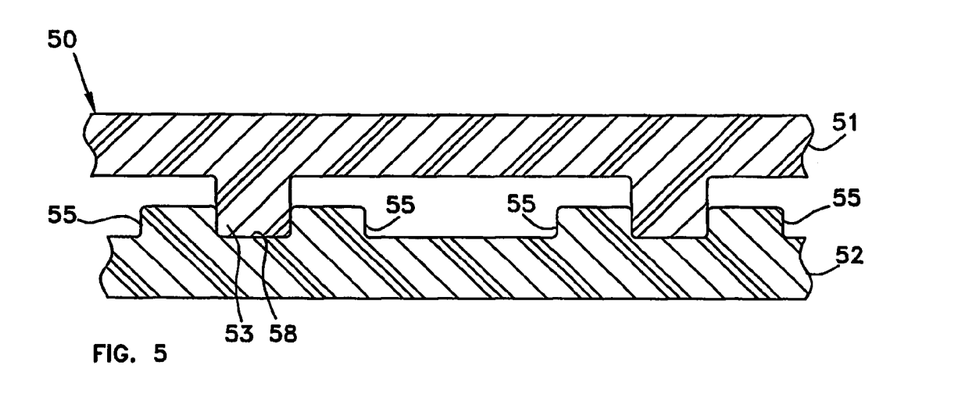
FIG. 5 is a sectional view of a fifth embodiment of a wall section according to the present invention.

Referring to FIG. 5, a fourth embodiment of a wall section 50 according to the present invention includes a first plastic component 51 and an opposing second plastic component 52. The first plastic component 51 is injection molded and includes a wall of non-uniform thickness that defines some ribs 53 and a web located between two of the ribs 53 in a portion of the wall where the wall is less thick than in the ribs 53, wherein at a cross section of the first plastic component 51, over the height of the ribs 53 the predominant thickness across each of the two ribs 53 is thicker than the thickness of the web. The second plastic component 52 is also injection molded and includes a wall of non-uniform thickness that defines some ribs 55 and a web 58 located between two of the ribs 55 in a portion of the wall where the wall is less thick than in the ribs 55, wherein at a cross section of the second plastic component 52, over the height of the ribs 55 the predominant thickness across each of the two ribs 55 is thicker than the thickness of the web 58. The crests of the ribs 53 of the first plastic component 51 contact the web 58 of the second plastic component 52, the crests of the ribs 55 of the second plastic component 52 do not contact the web of the first plastic component 51 and the web of the first plastic component 51 is apart from the web 58 of the second plastic component 52.

At least one pair of ribs 55 of the second wall component 52 are spaced apart by slightly more than the width of a rib 53 of the first wall component 51 to define a notch 58 in which a rib 53 of the first wall component 51 is disposed. Such disposition of the ribs 53 in the notches 58 prevents movement of the first wall component 51 with respect to the second wall component 52 and thereby maintains an optimum stiffness of the wall section 50.

Figure 6:
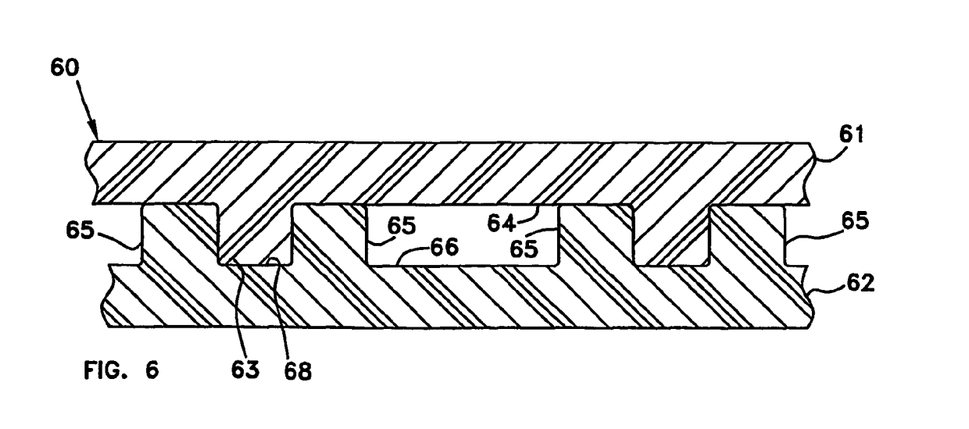
FIG. 6 is a sectional view of a sixth embodiment of a wall section according to the present invention.

Referring to FIG. 6, a sixth embodiment of a wall section 60 according to the present invention includes a first plastic component 61 and an opposing second plastic component 62. The first plastic component 61 is injection molded and includes a wall of non-uniform thickness that defines some ribs 63 and a web 64 located between two of the ribs 63 in a portion of the wall where the wall is less thick than in the ribs 63, wherein at a cross section of the first plastic component 61, over the height of the ribs 63 the predominant thickness across each of the two ribs 63 is thicker than the thickness of the web 64. The second plastic component 62 is also injection molded and includes a wall of non-uniform thickness that defines some ribs 65 and a web 66 located between two of the ribs 65 in a portion of the wall where the wall is less thick than in the ribs 65, wherein at a cross section of the second plastic component 62, over the height of the ribs 65 the predominant thickness across each of the two ribs 65 is thicker than the thickness of the web 66. The crests of the ribs 63 of the first plastic component 61 contact the web 66 of the second plastic component 62, and the web 64 of the first plastic component 61 is apart from the web 66 of the second plastic component 62. Also, the crests of the ribs 65 of the second plastic component 62 contact the web 64 of the first plastic component 61.

At least one pair of ribs 65 of the second wall component 62 are spaced apart by slightly more than the width of a rib 63 of the first wall component 61 to define a notch 68 in which a rib 63 of the first wall component 61 is disposed. Such disposition of the ribs 63 in the notches 68 prevents movement of the first wall component 61 with respect to the second wall component 62 and thereby maintains an optimum stiffness of the wall section 60.

Figure 6A:
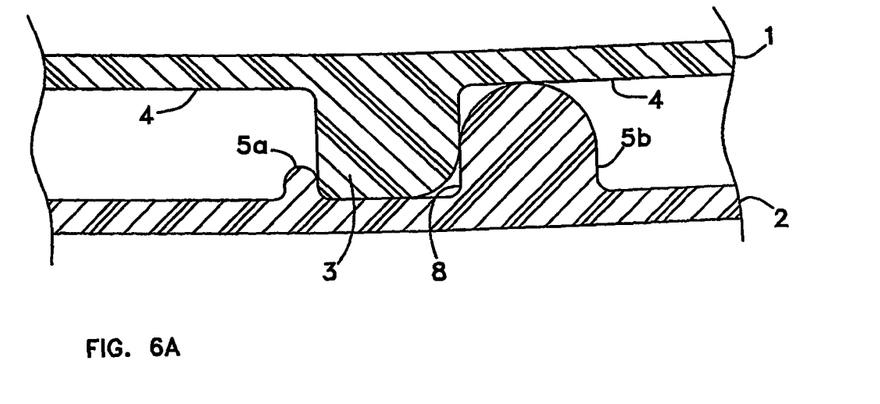
FIG. 6A is a sectional view of a preferred variation of the wall section embodiments shown in FIGS. 4, 5 and 6.

Referring to FIG. 6A, in a preferred variation of the embodiments of FIGS. 4, 5 and 6, in which a pair of ribs 5a, 5b of one plastic component 2 are spaced apart by slightly more than the thickness of a rib 3 of the other plastic component 1 to define a notch 8 in which the rib 3 of the other component 1 is disposed, the crest of one rib 5b contacts the web 4 of the other plastic component 1, and the crest of the other rib 5a does not contact the web 4. At a cross section of the other plastic component 1, over the height of the rib 3 the predominant thickness across the rib 3 is significantly thicker than the thickness of the web 4. In alternative embodiment including this variation, the pair of ribs 5a, 5b of the one plastic component 2 are spaced apart by approximately the thickness of the rib 3 of the other, plastic component 1 to define the notch 8 in which the rib 3 of the other component 1 is disposed. In preferred embodiments including this variation, the rib 3 of the other plastic component 1 and the notch 8 are so contoured that the rib 3 of the other plastic component 1 does not fully occupy the notch 8. This variation provides stability similar to the stability provided by the embodiments of FIGS. 4, 5 and 6, without requiring as much material to manufacture the product.

Figure 7:
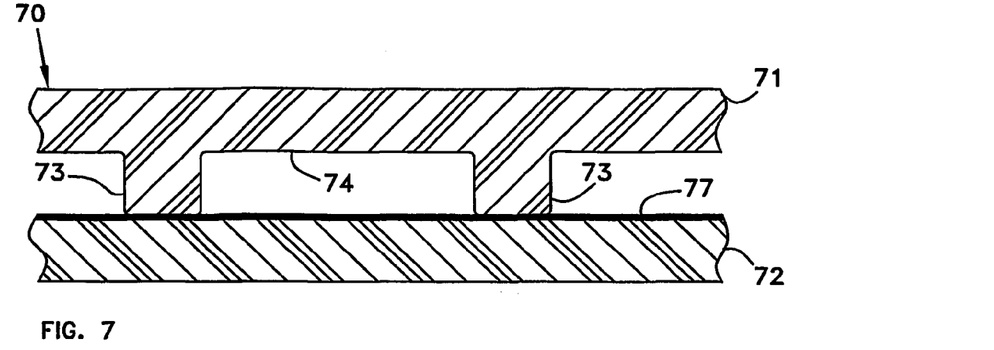
FIG. 7 is a sectional view of a seventh embodiment of a wall section according to the present invention.

Referring to FIG. 7, a seventh embodiment of a wall section 70 according to the present invention includes a first plastic component 71 and an opposing second plastic component 72. The first plastic component 71 is injection molded and includes a wall of non-uniform thickness that defines some ribs 73 and a web 74 located between two of the ribs 73 in a portion of the wall where the wall is less thick than in the ribs 73, wherein at a cross section of the first plastic component 71, over the height of the ribs 73 the predominant thickness across each of the two ribs 73 is thicker than the thickness of the web 74. The second plastic component 72 does not include ribs and is either injection molded or thermoformed. The crests of the ribs 73 of the first plastic component 71 contact the second plastic component 72 via a thin-material layer 77, such as a product label, and the web 74 of the first plastic component 71 is apart from the second plastic component 72. When the layer 77 includes a label, at least one of the plastic components 71, 72 is transparent so that the label can be viewed.

Figure 8:
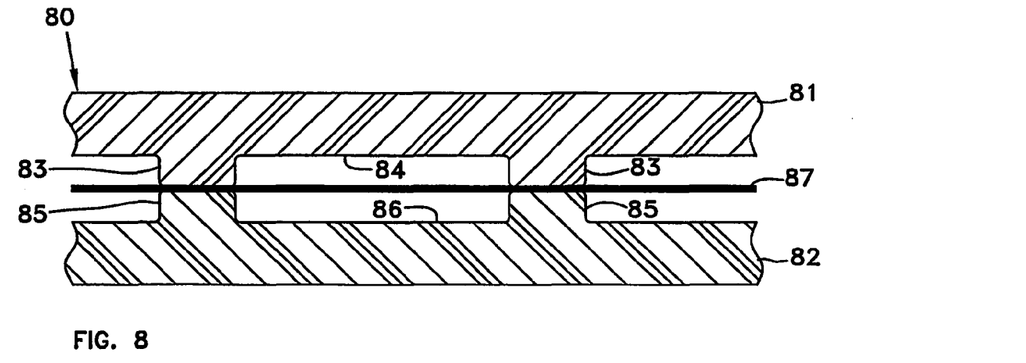
FIG. 8 is a sectional view of an eighth embodiment of a wall section according to the present invention.

Referring to FIG. 8, an eighth embodiment of a wall section 80 according to the present invention includes a first plastic component 81 and an opposing second plastic component 82. The first plastic component 81 is injection molded and includes a wall of non-uniform thickness that defines some ribs 83 and a web 84 located between two of the ribs 83 in a portion of the wall where the wall is less thick than in the ribs 83, wherein at a cross section of the first plastic component 81, over the height of the ribs 83 the predominant thickness across each of the two ribs 83 is thicker than the thickness of the web 84. The second plastic component 82 is also injection molded and includes a wall of non-uniform thickness that defines some ribs 85 and a web 86 located between two of the ribs 85 in a portion of the wall where the wall is less thick than in the ribs 85, wherein at a cross section of the second plastic component 82, over the height of the ribs 85 the predominant thickness across each of the two ribs 85 is thicker than the thickness of the web 86. The crests of the ribs 83 of the first plastic component 81 contact the crests of the ribs 85 of the second plastic component 82 via a thin-material layer 87, such as a product label; and the web 84 of the first plastic component 81 is apart from the web 86 of the second plastic component 82. When the layer 87 includes a label, at least one of the plastic components 81, 82 is transparent so that the label can be viewed.

Figure 9:
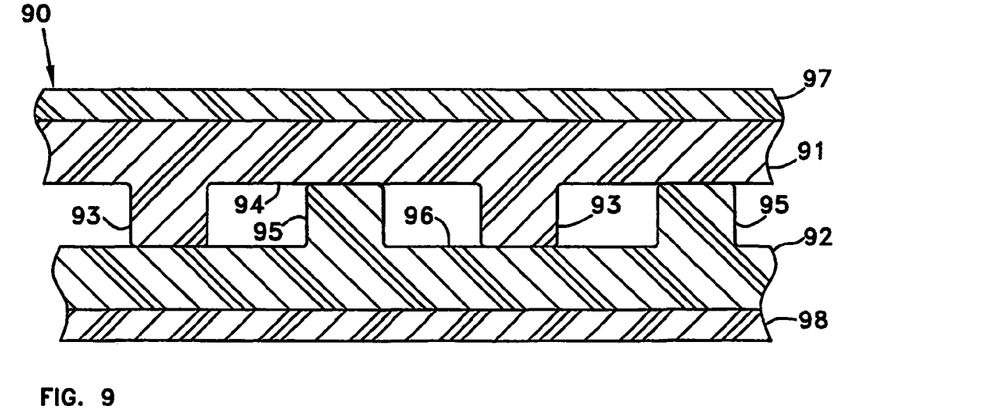
FIG. 9 is a sectional view of a ninth embodiment of a wall section according to the present invention.

Referring to FIG. 9, a ninth embodiment of a wall section 90 according to the present invention includes a first plastic component 91 and an opposing second plastic component 92. The first plastic component 91 is injection molded and includes a wall of, non-uniform thickness that defines some ribs 93 and a web 94, wherein at a cross section of the first plastic component 91, over the height of the ribs 93 the predominant thickness across each of the two ribs 93 is thicker than the thickness of the web 94. The second plastic component 92 is also injection molded and includes a wall of non-uniform thickness that defines some ribs 95 and a web 96 located between two of the ribs 95 in a portion of the wall where the wall is less thick than in the ribs 95, wherein at a cross section of the second plastic component 92, over the height of the ribs 95 the predominant thickness across each of the two ribs 95 is thicker than the thickness of the web 86. The crests of the ribs 93 of the first plastic component 91 contact the web 96 of the second plastic component 92, and the web 94 of the first plastic component 91 is apart from the web 96 of the second plastic component 92. Also, the crests of the ribs 95 of the second plastic component 92 contact the web 94 of the first plastic component 91.

The wall section 90 further includes a first exterior layer 97 laminated to the exterior of the first wall component 91 and a second exterior layer 98 laminated to the exterior of the second wall component 92. The desired characteristics of material in the respective wall components 91, 92 and exterior layers 97, 98 are selected from among moisture impervious, gas impervious and aroma impervious. The respective exterior layers 97, 98 are either injection molded or thermoformed. When the exterior layers 97, 98 are thermoformed they preferably are fabricated before fabrication of the respective laminated injection-molded wall component 91, 92 and disposed in the mold when the respective laminated wall component 91, 92 is injection molded. When the exterior layers 97, 98 are injection molded they preferably are fabricated after fabrication of the respective laminated injection-molded wall component 91, 92, and the respective laminated wall component 91, 92 is included in the mold in which the exterior layer 97, 98 is injection molded.

Figure 10:
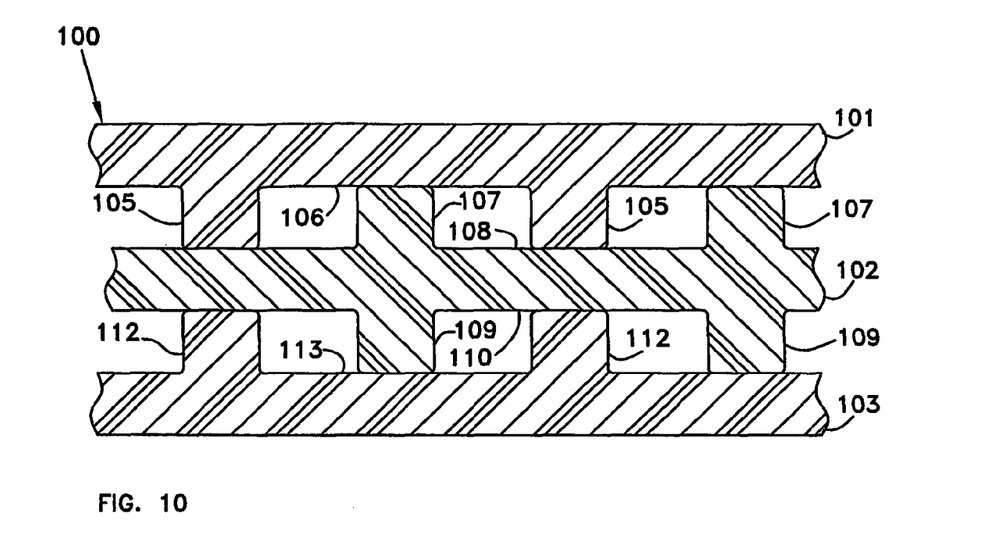
FIG. 10 is a sectional view of a tenth embodiment of a wall section according to the present invention.

Referring to FIG. 10, a tenth embodiment of a wall section 100 according to the present invention includes a first plastic component 101, an opposing second plastic component 102 and an opposing third plastic component 103. The first plastic component 101 is injection molded and includes a wall of non-uniform thickness that defines some ribs 105 and a web 106 located between two of the ribs 105 in a portion of the wall where the wall is less thick than in the ribs 105, wherein at a cross section of the first plastic component 101, over the height of the ribs 105 the predominant thickness across each of the two ribs 105 is thicker than the thickness of the web 106. The second plastic component 102 is also injection molded and includes a wall of non-uniform thickness that defines some ribs 107 on a first side of the second plastic wall component 102 opposing the first wall component 101 and a web 108 located between the ribs 107 in a portion of the wall where the wall is less thick than in the ribs 107, wherein at a cross section of the second plastic component 102, over the height of the ribs 107 the predominant thickness across each of the two ribs 107 is thicker than the thickness of the web 108. The second plastic component 102 further defines a second set of some ribs 109 on a second side of the second plastic component 102 opposing the third wall component 103 and a web 110 located between the ribs 109 in a portion of the wall where the wall is less thick than in the ribs 109, wherein at a cross section of the second plastic component 102, over the height of the ribs 109 the predominant thickness across each of the two ribs 109 is thicker than the thickness of the web 110. The third plastic component 103 is also injection molded and includes a wall of non-uniform thickness that defines some ribs 112 and a web 113 located between the ribs 112 in a portion of the wall where the wall is less thick than in the ribs 112, wherein at a cross section of the third plastic component 103, over the height of the ribs 112 the predominant thickness across each of the two ribs 112 is thicker than the thickness of the web 113.

The ribs 105 of the first wall component 101 contact the web 108 on the first side of the second wall component 102, and the web 106 of the first wall component 101 is apart from the web 108 on the first side of the second wall component 102. Also, the ribs 107 on the first side of the second wall component 102 contact the web 106 of the first wall component 101. The ribs 112 of the third wall component 103 contact the web 110 on the second side of the second wall component 102, and the web 113 of the third wall component 103 is apart from the web 110 on the second side of the second wall component 102. Also, the ribs 109 on the second side of the second wall component 102 contact the web 113 of the third wall component 103.

Referring to FIGS. 11 through 14, alternative embodiments of a cup 120 according to the present invention include a sidewall section 121 embodied as described with reference to FIGS. 1 through 9. The cup 120 also includes a base wall section 122 and a rim section 123. In some of these embodiments, the cup 120 is fabricated by nesting an inner cup component 125 within an outer cup component 126. Each cup component 125, 126 includes a sidewall component 128, 128' a base wall component 129 and a rim component 130, 130'. The cup components 125, 126 are fabricated apart from each other. The sidewall section 121 of the cup 120 according to one of such alternative embodiments is assembled by nesting the inner cup component 125 within the outer cup component 126 to thereby combine the sidewall component 128 of the inner cup component 125 with the sidewall component 128' of the outer cup component 126. The inner cup component 125 is forcibly nested into the outer cup component 126 so that the rim component 130 of the inner cup component 125 becomes attached to the rim component 130' of the outer cup component 126 to thereby form a coherent cup.

The ribs on the sidewall components 128, 128' of the respective cup components 125, 126 are formed in mold-cavity channels that enhance molten plastic material flow during injection molding of such sidewall components 128, 128'. Such mold-cavity channels reduce injection pressure and mold clamping requirements. In some embodiments, the cup components 125, 126 are fabricated by the methods described in European Patent Application Publication EP 1 174 238 A1 and/or the patent publications cited therein and as further described in U.S. patent application Ser. No. 10/050, 434 filed Jan. 15, 2002.

Figures 11, 12, 13, 14:
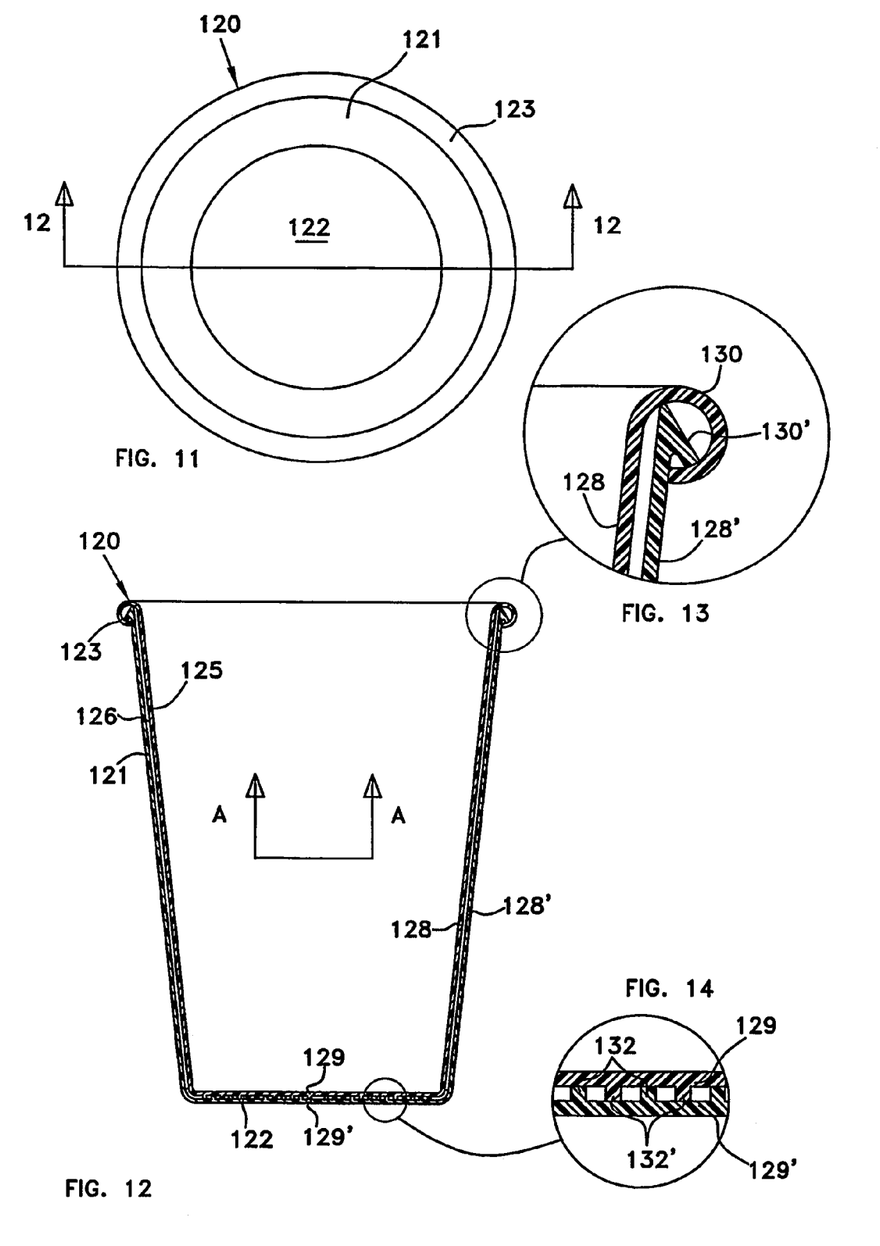
FIG. 11 is a top plan view of a cup having a sidewall section according to the present invention.
FIG. 12 is a sectional view of the cup of FIG. 11, taken along line 12-12 in FIG. 11. The sectional views of FIGS. 1-9 of sidewall sections included in alternative embodiments of the cup of FIG. 12 are taken along line A-A in FIG. 12. These sectional views do not account for the curvature of the sidewall section of the cup.
FIG. 13 is an enlarged sectional view of the rim portion 13 of the cup of FIG. 12
FIG. 14 is an enlarged sectional view of a portion 14 of the bottom wall section of the cup of FIG. 12

The respective rims components 130, 130' of the different cup components 125, 126 are so shaped, such as shown in FIG. 13, that when the cup components 125, 126 are forcibly nested together the respective rim components 130, 130' become attached to one another to thereby make the cup coherent. The rim component 130 of the inner cup component 125 may be fabricated by the method described in U.S. patent application Ser. No. 10/283,979 filed Oct. 30, 2002.

The base wall component 129, 129' of each cup component 125, 126 also includes ribs 132, 132', as shown in FIG. 14, that are formed during injection molding of the respective cup components 125, 126. Accordingly, the cup 120 also includes a base wall section 122 embodied as described with reference to FIGS. 1 through 9.

In another alternative embodiment (not shown), the cup includes the sidewall section described with reference to FIG. 10. Such a cup is fabricating by nesting an inner cup component, an intermediate cup component and an outer cup component. In other respects such a cup has the same features as the cup described above with reference to FIGS. 11 through 14.

In some of such nested-cup-component embodiments and in other embodiments, in which the various wall sections of FIGS. 1 through 10 are not included in a cup, the product is made coherent by attaching at least one of the ribs of the one wall component to the other wall component at the place of contact with the other wall component. Preferably, more than one portion of the ribs are so attached and such attachment is accomplished by ultrasonic welding.

Figure 15:
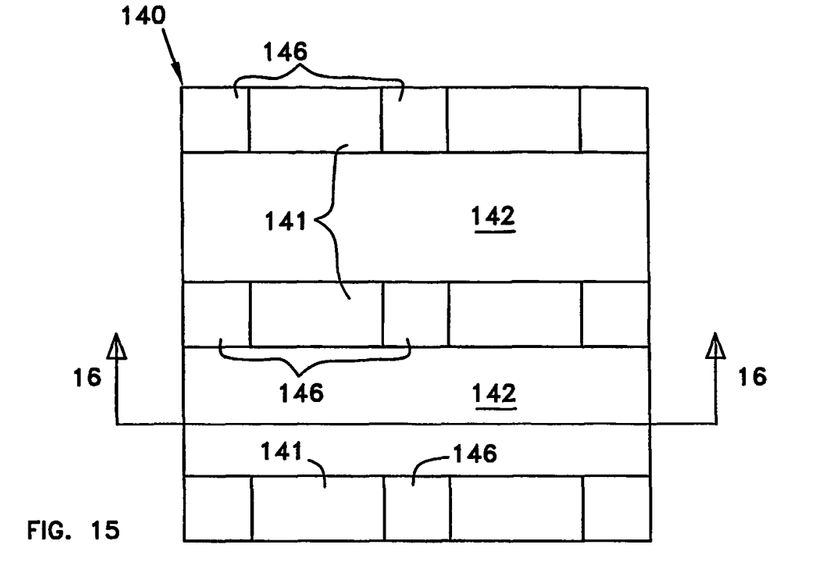
FIG. 15 is a plan view of a wall component of an embodiment of another wall section according to the present invention.
Figure 16:
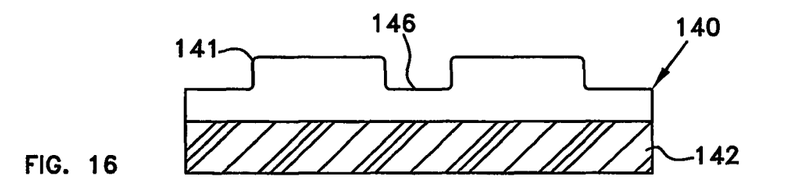
FIG. 16 is a sectional view of the wall component of FIG. 15, taken along line 16-16 in FIG. 15.
Figure 17:
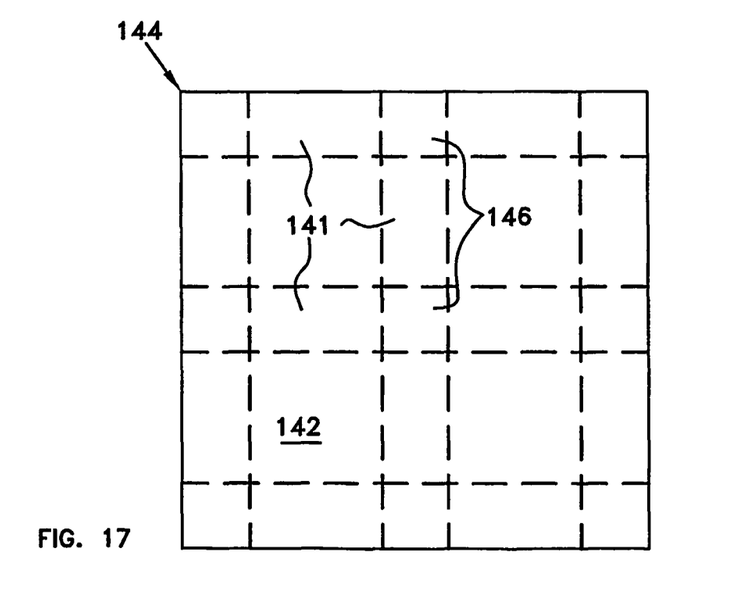
FIG. 17 is a plan view of a wall section including the wall component of FIG. 15 combined with another such wall component disposed in opposition and oriented at an angle of ninety degrees thereto.

In another embodiment of a wall section according to the present invention, two injection molded plastic wall components 140 having two or more ribs 141 and a web 142 therebetween, as shown in FIGS. 15 and 16 are oriented at ninety degrees to one another and combined in opposition to each other with the ribs 141 of one wall component contacting the ribs 141 of the other wall component to form a wall section 144 as shown in FIG. 17, in which the ribs of one wall component 140 are aligned at a ninety-degree angle to the ribs of the other wall component 140. The ribs 141 are thicker than the thickness of the web 142. The web 142 of one wall component 140 is apart from the web 142 of the other wall component 140. In this embodiment the ribs 141 include indentations 146 at positions where the ribs 141 of one wall component contact the ribs 141 of the other wall component. Preferably, more than one portion of the ribs 141 of one wall component are attached by ultrasonic welding to the ribs of the other wall component at the places on contact therewith.

In alternative embodiments, the wall components 140 are so oriented with respect to one another that the ribs of one wall component 140 are aligned at other than a ninety-degree angle to the ribs of the other wall component 140.

In some embodiments, the wall section shown in FIGS. 15, 16 and 17 is a portion of a more extensive wall section of a product.

The wall section of the present invention has an enhanced thermal insulation characteristic in relation to a solid wall section of comparable thickness and material. When such a wall section is included in the sidewall section and/or the base wall section of a cup, this characteristic reduces the formation of moisture on the exterior of the cup when the cup contains a chilled beverage, and prevents the outer surface of cup from becoming too hot to hold when the cup contains a hot beverage.

The wall section of the present invention can be an arbitrarily small portion of a more extensive wall section of a product.

The desired characteristics of material in the respective wall components are selected from among moisture impervious, gas impervious and aroma impervious.

Additional embodiments of the present invention (not shown) include all different combinations of the features described herein that are not incompatible with one another.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A coherent product including a wall section, wherein the wall section comprises:

a first plastic component that is injection molded and includes a wall of non-uniform thickness that defines some ribs and a web located between two of the ribs in a portion of the wall where the wall is less thick than in the ribs; and an opposing second plastic component that is injection molded and includes a wall of non-uniform thickness that defines some ribs and a web located between two of the ribs in a portion of the wall where the wall is less thick than in the ribs;

wherein at least the crest of a portion of the ribs of the first plastic component directly or indirectly contacts the second plastic component, and at least a portion of the web of the first plastic component is apart from the web of the second plastic component;

wherein at a cross section of the first plastic component, over the height of the ribs the predominant thickness across each of the two ribs is significantly thicker than the thickness of the web, and wherein at a cross section of the second plastic component, over the height of the ribs the predominant thickness across each of the two ribs is significantly thicker than the thickness of the web; and wherein at least one pair of ribs of one said plastic component are spaced apart to define a notch in which the rib of the other said plastic component is disposed without contacting the web of the one said plastic component.

2. A product according to claim 1, wherein at least one pair of ribs of the other said plastic component are spaced apart to define a notch in which at least the crest of the rib of the one said plastic component is disposed without contacting the web of the other said plastic component.

3. A coherent product including a wall section, wherein the wall section comprises:

a first plastic component that is injection molded and includes a wall of non-uniform thickness that defines some ribs and a web located between two of the ribs in a portion of the wall where the wall is less thick than in the ribs; and an opposing second plastic component that is injection molded and includes a wall of non-uniform thickness that defines some ribs and a web located between two of the ribs in a portion of the wall where the wall is less thick than in the ribs;

wherein at least the crest of a portion of, the ribs of the first plastic component directly or indirectly contacts the second plastic component, and at least a portion of the web of the first plastic component is apart from the web of the second plastic component;

wherein at a cross section of the first plastic component, over the height of the ribs the predominant thickness across each of the two ribs is significantly thicker than the thickness of the web, and wherein at a cross section of the second plastic component, over the height of the ribs the predominant thickness across each of the two ribs is significantly thicker than the thickness of the web;

wherein at least one pair of ribs of one said plastic component are spaced apart to define a notch in which the rib of the other said plastic component is dispose; and wherein at least the crest of one rib of said at least one pair of spaced-apart ribs of said one plastic component contacts the web of the other said plastic component, and the other rib of said at least one pair of spaced-apart ribs of said one said plastic component does not contact the web of the other said plastic component.

* * * * *

UNITED STATES PATENT AND TRADEMARK OFFICE
CERTIFICATE OF CORRECTION

PATENT NO. : 8,418,875 B2
APPLICATION NO. : 10/540096
DATED : April 16, 2013
INVENTOR(S) : Jens Ole Sorensen and Soren Christian Sorensen It is certified that error appears in the above-identified patent and that said Letters Patent is hereby corrected as shown below:

In the Specification

Column 1, after line 47, insert the following paragraph:

--The present invention further provides a coherent product including a wall section, wherein the wall section comprises: a first plastic component that is injection molded and includes a wall of non-uniform thickness that defines some ribs and a web located between two of the ribs in a portion of the wall where the wall is less thick than in the ribs; and an opposing second plastic component that is injection molded and includes a wall of non-uniform thickness that defines some ribs and a web located between two of the ribs in a portion of the wall where the wall is less thick than in the ribs; wherein at least the crest of a portion of the ribs of the first plastic component directly or indirectly contacts the second plastic component, and at least a portion of the web of the first plastic component is apart from the web of the second plastic component; and wherein at a cross section of the first plastic component, over the height of the ribs the predominant thickness across each of the two ribs is significantly thicker than the thickness of the web, and wherein at a cross section of the second plastic component, over the height of the ribs the predominant thickness across each of the two ribs is significantly thicker than the thickness of the web; wherein at least one pair of ribs of one said plastic component are spaced apart to define a notch in which the rib of the other said plastic component is disposed; and wherein at least the crest of one rib of said at least one pair of spaced-apart ribs of said one plastic component contacts the web of the other said plastic component, and the other rib of said at least one pair of spaced-apart ribs of said one said plastic component does not contact the web of the other said plastic component.--

In the Claims

Column 10, line 43, claim 3, change "dispose" to --disposed--

Signed and Sealed this
Fifteenth Day of October, 2013

Teresa Stanek Rea
*Deputy Director of the United States Patent and Trademark Office*